(12) United States Patent
Johnson et al.

(10) Patent No.: US 7,493,979 B2
(45) Date of Patent: Feb. 24, 2009

(54) POWER-ASSISTED CART RETRIEVER WITH ATTENUATED POWER OUTPUT

(75) Inventors: Daniel T. Johnson, Medina, MN (US); Paul D. Holtan, Savage, MN (US); James W. Wiff, Cologne, MN (US)

(73) Assignee: Dane Industries, Inc., Plymouth, MN (US)

( * ) Notice: Subject to any disclaimer, the term of this patent is extended or adjusted under 35 U.S.C. 154(b) by 0 days.

(21) Appl. No.: 12/125,138

(22) Filed: May 22, 2008

(65) Prior Publication Data

US 2008/0257618 A1      Oct. 23, 2008

Related U.S. Application Data

(63) Continuation of application No. 10/947,831, filed on Sep. 23, 2004, now Pat. No. 7,389,836.

(60) Provisional application No. 60/505,546, filed on Sep. 23, 2003.

(51) Int. Cl.
*B60K 1/00* (2006.01)

(52) U.S. Cl. ........................ 180/65.1; 701/93

(58) Field of Classification Search .............. 180/171, 180/173, 174, 333, 338, 167, 65.1, 15, 16, 180/907; 701/93, 96; 361/51; 123/350, 123/351, 352, 349, 378; 280/33.992
See application file for complete search history.

(56) References Cited

U.S. PATENT DOCUMENTS

| | | | | |
|---|---|---|---|---|
| 5,573,078 A | * | 11/1996 | Stringer et al. | 180/19.2 |
| 6,070,679 A | * | 6/2000 | Berg et al. | 180/19.2 |
| 6,220,379 B1 | * | 4/2001 | Schugt et al. | 180/65.1 |
| 6,244,366 B1 | * | 6/2001 | Otterson et al. | 180/11 |
| 7,389,836 B2 | * | 6/2008 | Johnson et al. | 180/65.1 |

* cited by examiner

*Primary Examiner*—Christopher P Ellis
*Assistant Examiner*—Brian Swenson
(74) *Attorney, Agent, or Firm*—Dorsey & Whitney LLP

(57) ABSTRACT

The present invention is a motorized shopping cart retriever that includes a controller that attenuates the power provided to the drive system of the retriever to prevent the retriever from being utilized to move an excessively heavy load of shopping carts. By preventing the retriever and carts from being subjected to overloaded conditions, the operational lives of the retriever and carts are maximized. The retriever is also provided with a burst mode that allows the power provided to the drive system to rapidly increase past the normal attenuated level for a brief period of time in order to reduce the time required to accelerate a retriever loaded with carts to a terminal velocity.

21 Claims, 3 Drawing Sheets

POWER-ASSISTED CART RETRIEVER WITH ATTENUATED POWER OUTPUT

CROSS REFERENCE TO RELATED APPLICATIONS

The present application claims priority to U.S. Provisional Patent Application 60/505,546, which was filed Sep. 23, 2003 and is hereby incorporated in its entirety into the present application.

FIELD OF THE INVENTION

The present invention relates to devices and methods for assisting in the retrieval of wheeled shopping carts in parking lots. More specifically, the present invention relates to devices and methods of controlling power assisted (i.e., motorized) shopping cart retrievers.

BACKGROUND OF THE INVENTION

Retrieving shopping carts in large parking lots is primarily a manual task. Workers push or pull a column of stacked wheeled shopping carts from various collection areas located throughout the parking lots. The longer the column of carts being pushed or pulled, the more difficult it becomes to control. Thus, workers limit the number of carts when moving carts manually.

Even with more than one worker, the collecting and guiding of long columns of carts is difficult and time consuming. Furthermore, in large parking lots, workers must push or pull the column of carts great distances. The retrieval task can be physically exhausting and may result in injury to the workers. Carts also can be damaged as the workers struggle to push or pull long columns to the store door.

In response to the difficulties associated with manual retrieval of shopping carts, one known apparatus utilized a motorized cart retriever for pulling or pushing a column of shopping carts through the parking lot in a train-like fashion. In the case where shopping carts are pulled, a rope extends from the motorized retriever and is fastened to the last cart in the column of carts. Each time a cart is added to the column, the rope must be unfastened from the previous cart, extended further, and then secured to the cart added at the end of the column. The operator then walks alongside the motorized retriever as it pulls thirty-five or more carts.

An improved motorized shopping cart retriever is disclosed in U.S. Pat. No. 5,934,694 to Schugt et al., which issued Aug. 10, 1999, and U.S. Pat. No. 6,220,379 to Schugt et al., which issued Apr. 24, 2001. Both of these patents are hereby incorporated by reference in their entireties into the present application.

As indicated in FIG. 1, which is a front perspective view of the retriever 2 disclosed in the referenced patents, the retriever 2 is an electric-powered vehicle with electronic remote control that allows an operator to use the retriever for retrieval of wheeled shopping carts. The retriever can be operated in a remote or manual mode. The retriever 2 provides a foot pedal, a seat 4 and a steering wheel 6 for manual operation. The retriever is powered by an electric drive and includes dynamic braking and a parking brake.

An additional method of shopping cart retrieval disclosed in the referenced patents includes pushing the shopping carts with a non-rideable electric-powered retriever that provides for both manual and remote operation. The retriever is moved to the location of the shopping carts either manually or by remote control. The shopping carts are attached to the front of the retriever, the unit is operated in remote mode, and the operator guides the shopping carts from the front of the cart train with the retriever pushing the column of shopping carts.

While motorized shopping cart retrievers are advantageous over manual methods of shopping cart retrieval, the use of motorized retrievers has presented some new problems. For example, because motorized retrievers are able to push a greater number of shopping carts than can be done manually, operators of the motorized retrievers often overload the retrievers by running exceedingly long strings of carts that the operator could not manually move by himself. This overloading can result in damage to the shopping carts and damage to the retriever due to the excessive stresses exerted on the carts and retriever by the exceedingly long string of carts. The great mass and length of such strings of carts increases the difficulty in starting, maneuvering and stopping the strings. This presents a danger to pedestrians and cars in the parking lot. Also, the great length of such strings of carts can interfere with pedestrian and vehicle traffic in a parking lot.

There is a need in the art for a device that can prevent an operator from overloading a motorized shopping cart retriever. There is also a need in the art for a method of preventing an operator from overloading a motorized shopping cart retriever.

SUMMARY OF THE INVENTION

The present invention, in one embodiment, is a motorized shopping cart retriever that includes an electronic controller configured to attenuate the power output of the retriever's drive system. Attenuating the power output of the drive system provides load control and reduces the risk that the retriever or its shopping carts will be subjected to overload conditions.

In one embodiment, the controller has a first mode that limits the power provided to the electric motor to a level that is within a range that will optimize component life for the retriever and the shopping carts being moved by the retriever. Depending on the embodiment, this may be achieved by attenuating the current or the voltage supplied to the electric motor.

In one embodiment, the controller also has a second mode that allows the power provided to the electric motor to exceed the limit of the first mode. The extra power may be provided for an amount of time that may be varied according to the circumstances to allow more power to the retriever so as to account for variations in conditions during startup of the of the retriever while loaded.

The present invention, in one embodiment, is a shopping cart retriever comprising an electric motor, a drive system powered by the electric motor, a throttle control and an analog or digital controller adapted to provide power to the electric motor and including a first power limit, a second power limit, and a burst mode. The throttle control is in communication with the controller. The first power limit is the controller's normal power limit that results when the controller self-limits its maximum power output through a current or temperature sensing feature of the controller that exists to prevent damage to the controller. The second power limit is selectable and limits the control's maximum power output to a level that is less than that of the first power limit. The burst mode allows the control's maximum power output to exceed the second power limit for a limited time before again becoming subject to the second power limit.

In one embodiment, the second power limit is selected to provide a power output level that optimizes the operational life of a component of the retriever or of a shopping cart. In one embodiment, the second power limit is selected to provide a power output level that prevents the retriever from being subjected to an overload condition. In one embodiment, the burst mode includes a third power limit that is selectable and limits the control's maximum power output to a level that is less than that of the first power limit and greater than that of the second power limit. In one embodiment, the second power limit attenuates current or voltage.

The present invention, in one embodiment, is a method of operating a shopping cart retriever. The method comprises placing a controller in electrical communication with an electric motor adapted to power a drive system of the retriever, placing a throttle control in communication with the controller, setting the controller at a first power limit that is less than a second power limit, and moving at least one shopping cart with the cart retriever by sending power to the electrical motor from the controller at a level no greater than the first power limit although the throttle is set at 100 percent full throttle.

In one embodiment, the second power limit is the controller's normal power limit that results when the controller self-limits its maximum power output through a sensing feature of the controller that exists to prevent damage to the controller In one embodiment, the first power limit is set to provide a power output level that optimizes the operational life of a component of the retriever or of a shopping cart. In one embodiment, the first power limit is set to provide a power output level that prevents the retriever from being subjected to an overload condition. In one embodiment, the first power limit is achieved by attenuating a current or a voltage provided to the electrical motor by the controller.

The present invention, in one embodiment, is a method of operating a shopping cart retriever. The method comprises placing a controller in electrical communication with an electric motor adapted to power a drive system of the retriever, placing a throttle control in communication with the controller, setting the controller at a first power limit that is less than a second power limit, attaching the retriever to at least one shopping cart; and activating a burst mode to accelerate the retriever and the at least one shopping cart from a complete stop to a terminal velocity.

In one embodiment, the second power limit is the controller's normal power limit that results when the controller self-limits its maximum power output through a sensing feature of the controller that exists to prevent damage to the controller. In one embodiment, when activating the burst mode, the power provided to the motor from the controller rapidly increases to a burst limit and then rapidly decreases from the burst limit to reach a level approximate the first limit when the retriever approaches the terminal velocity. In one embodiment, the burst limit is less than the second power limit and greater than the first power limit.

In one embodiment, the first power limit is set to provide a power output level that optimizes the operational life of a component of the retriever or of a shopping cart. In one embodiment, the first power limit is set to provide a power output level that prevents the retriever from being subjected to an overload condition. In one embodiment, the first power limit is achieved by attenuating a current or a voltage provided to the electrical motor by the controller.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION OF THE INVENTION

The present invention, in one embodiment, is a power assisted shopping cart retriever including an a controller adapted to attenuate the power directed to the drive system of the retriever. The present invention is advantageous because it prevents an operator from operating the retriever in an overloaded condition.

Figure 1:
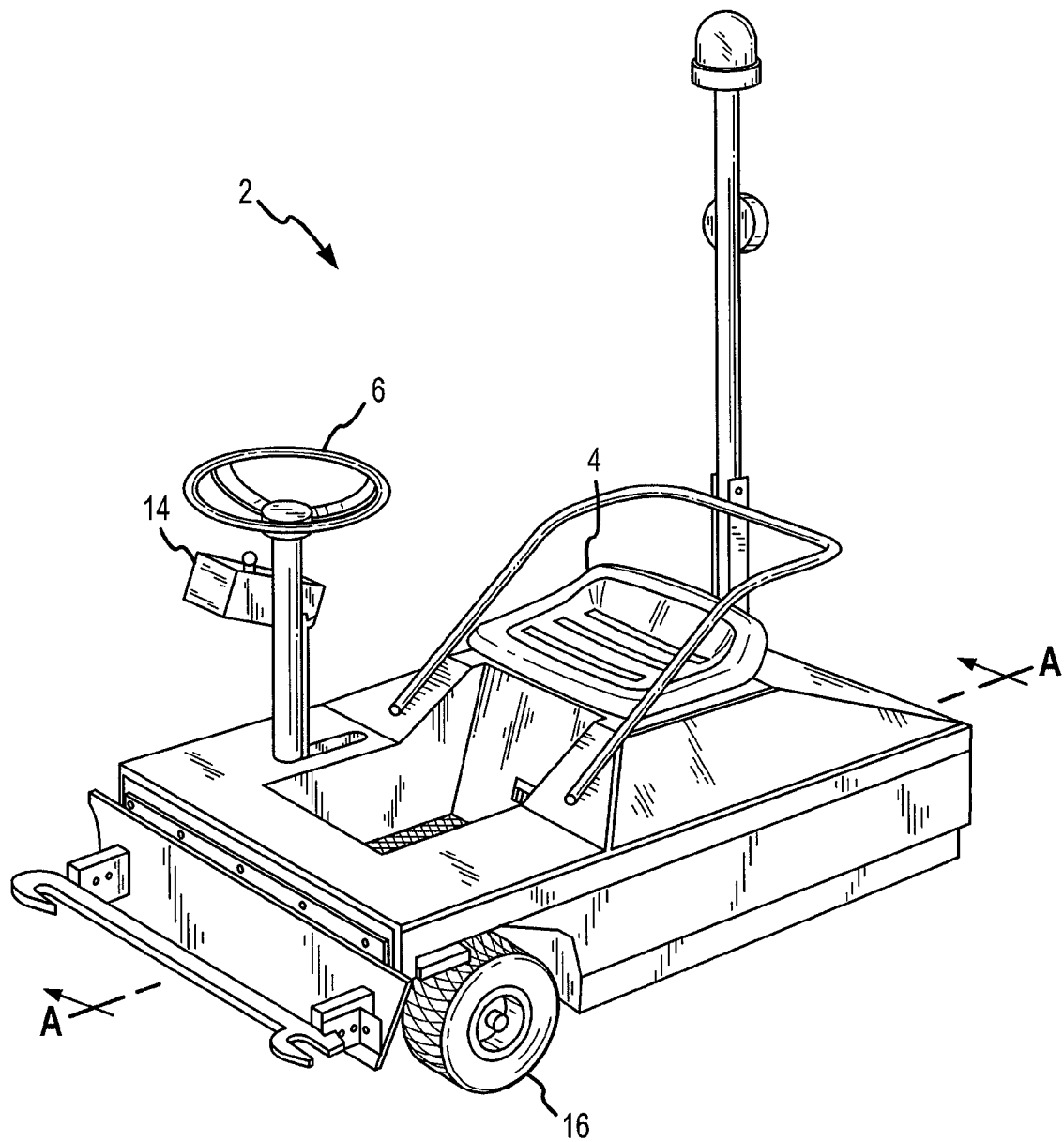
FIG. 1 is a front perspective view of a shopping cart retriever as disclosed in U.S. Pat. Nos. 5,934,694 and 6,220,379.
Figure 2:
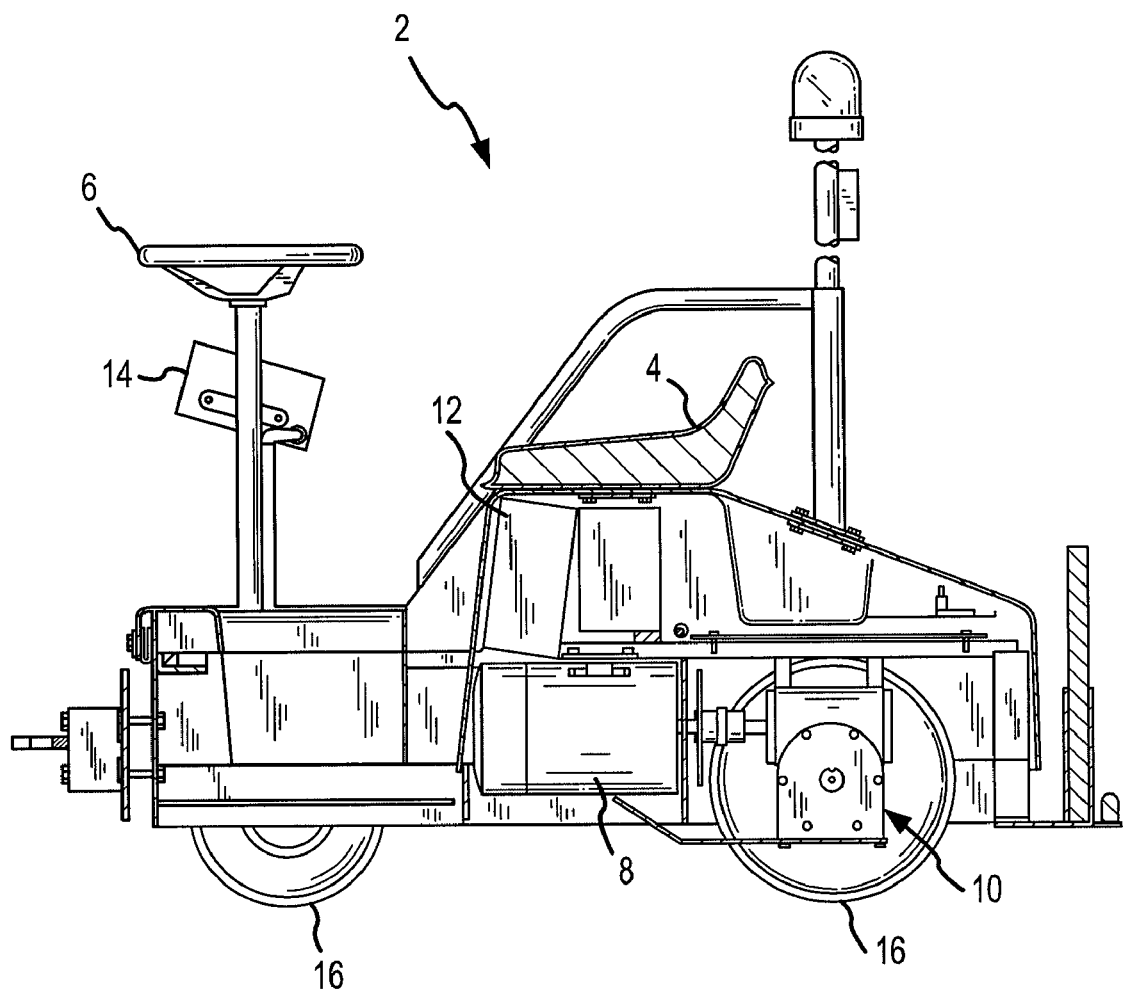
FIG. 2 is a sectional side elevation of the retriever of the present invention as if taken through section line AA of FIG. 1.

For a detailed description of the present invention, reference is now made to FIG. 2, which is a sectional side elevation of the retriever 2 of the present invention as if taken through section line AA of FIG. 1. As shown in FIG. 2, in one embodiment, the retriever 2 includes a seat 4, a steering wheel 6, an electric motor 8, a drive system 10, a controller 12, a speed throttle control 14 and wheels 16. The electric motor 8 powers the drive system 10 and is controlled by a controller 12. The speed throttle control 14 of the retriever 2 communicates with the controller 12 whether the speed throttle control 14 is mounted on the retriever 2 or is portable. The drive system 10 includes a gear arrangement constructed to transmit rotational shaft power from the electric motor 8 through a combination of gears and shafts to one or more of the wheels 16 for the purpose of turning the wheels 16 to move the retriever 2.

In one embodiment, the controller 12 is an electronic motor controller 12 used to control the power provided to the electric motor 8 and, as a result, the power output of the drive system 10. In one embodiment, the controller 12 shall have programmable parameters that control the maximum current available to the electric motor 8. In one embodiment, such a controller 12 will exhibit the motor performance characteristics graphically illustrated in FIG. 3.

Figure 3:
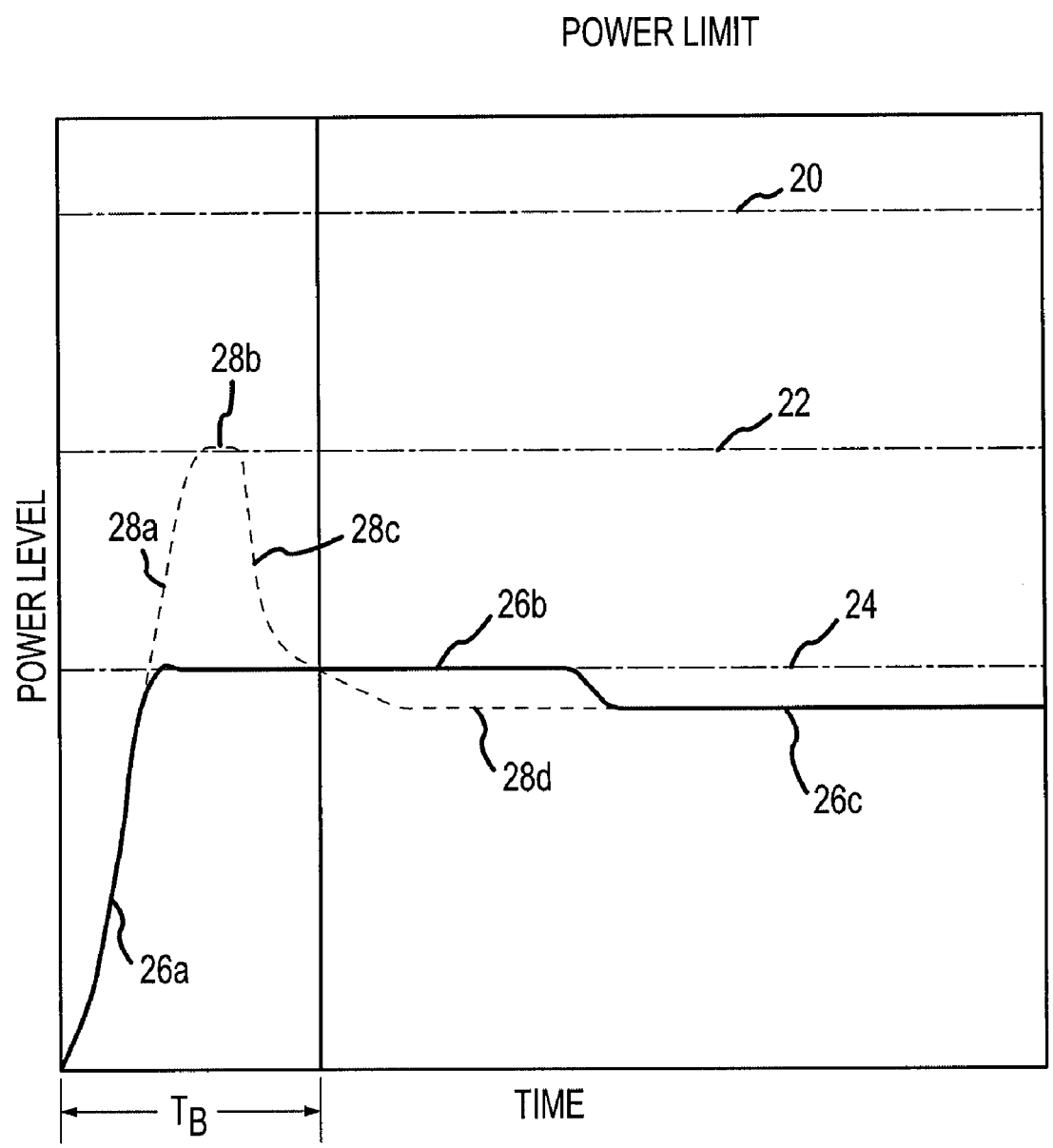
FIG. 3 graphically represents the performance characteristics of the electric motor when caused to operate in various modes by the controller.

As shown in FIG. 3, in one embodiment, the controller 12 will have an internal limit mode, a burst mode, and a selected limit mode that will result in the following three respective power limits, which are the internal limit 20, the burst limit 22 and the selected limit 24. The internal limit 20, which is represented in FIG. 3 by the uppermost horizontal dashed line having a light line weight, is the controller's normal current limitation that results when the controller 12 self-limits its maximum power output to the electric motor 8 through the controller's temperature or current level sensing to prevent damage to the controller 12.

In one embodiment, the selected limit 24, which is represented in FIG. 3 by the lowermost horizontal dashed line having a light line weight, is in addition to the internal limit 20 and allows the controller 12 to further limit the power allotted to the electric motor 8. For example, the controller 12 may be programmed such that the selected limit 24 corresponds to power levels that are optimal for the operating life of the retriever 2 and shopping cart components. Thus, when the controller 12 is operating in selected limit mode and power provided to the motor 8 is capped at the selected limit 24, the power output to the drive system 10 is maintained within the limits necessary to achieve optimum operating life for the drive system 10 and the associated components of the retriever 2. Furthermore, the retriever 2 is only able to move a reduced number of shopping carts as compared to when the controller 12 is operating in internal limit mode. In other words, the controller 12 when operating in selected limit mode acts as a governor that prevents a user from overloading the retriever 2 with excessively long strings of shopping carts.

As illustrated in FIG. 3, when the controller 12 is in selected limit mode, the selected limit power draw profile ("SLPDP") 26a-26c, which is represented in FIG. 3 by a dark solid line, increases rapidly over time (see segment 26a) until it reaches the level of the selected limit 24 where the SLPDP remains (see segment 26b) until the retriever 2 and its load (i.e., a string of shopping carts) have reached a terminal velocity and the SLPDP drops to a level that is below the selected limit 24 (see segment 26c).

As can be understood from FIG. 3, when the controller 12 is in selected limit mode, the SLPDP 26b remains at the selected limit 24 for a substantial amount of time. This is because the electric motor 8, when the controller 12 is in selected limit mode, only provides a limited amount of power to the drive system 10. Consequently, it takes a substantially longer amount of time to accelerate the retriever 2 and its load to a terminal velocity when operating at the selected limit 24 than it otherwise would were the motor 8 provided with the power available at the internal limit 20.

In one embodiment, to reduce the amount of time needed to accelerate the retriever 2 and its load to terminal velocity, the controller 12 can be placed in burst mode. As indicated in FIG. 3, when the controller 12 is in burst mode, the burst limit power draw profile ("BLPDP") 28a-28d, which is represented in FIG. 3 by a dark dashed line, may increase rapidly up past the selected limit 24 to peak at the burst limit 22, which is represented in FIG. 3 by the horizontal dashed line having a light line weight and located between the internal limit 20 and the selected limit 24.

As can be understood from FIG. 3, during burst mode, the controller 12, for a certain time period $T_B$, allows the electric motor 8 to receive electrical current that exceeds the selected limit 24. As a result, over the burst mode time period $T_B$, the electric motor 8 provides an increased amount of power to the drive system 10, which in turn decreases the time required for the retriever 2 and its load to reach a terminal velocity.

As indicated in FIG. 3, when the retriever 2 and its load are encountering a condition of high frictional resistance (e.g., starting from a dead stop) and burst mode is activated, the BLPDP 28a-28d increases rapidly (see segment 28a) past the selected limit 24 until peaking at the burst limit 22 (see segment 28b). The BLPDP then begins to rapidly decrease (see segment 28c) until terminal velocity is achieved at the end of the burst mode time period $T_B$ and the BLPDP drops back below the selected limit 24 (see segment 28d) as the retriever 2 and its load cruise at the terminal velocity.

The burst mode and its associated spike in power, as indicated in FIG. 3, is especially helpful when the retriever 2 is being started from a stopped state. This is because the resting friction of the cart retriever 2 and its load is larger than its moving friction, so a "burst of power" (i.e., the burst mode current) allows the controller 12 to provide current to the electric motor 8 that exceeds the current available in selected limit mode. This allows the retriever 2 and its load to more quickly reach a terminal velocity. As a result, a smaller amount of time is spent accelerating the retriever 2 and load to terminal speed, which allows the retriever 2 to be maneuvered and operated more efficiently.

In one embodiment, the controller 12 will provide extra power on startup to allow for greater variations in environmental conditions such as snow, ice, extreme temperatures, etc. that affect the load the carts place on the motorized cart retriever 2. In one embodiment, the controller 12 is provided with a burst mode feature that may be enabled or disabled. The burst mode feature may also provide the ability to adjust, set or reset the rate at which the burst mode current level will rise.

In one embodiment, the burst mode feature will provide the ability to set the length of the time period $T_B$ during which the burst mode current will be in effect. The burst mode feature may also provide the ability to determine or specify the conditions necessary for the burst mode feature to operate. For example, the burst mode feature may provide the ability to determine or specify a minimum time period between burst mode activations. The burst mode feature may also provide the ability to select a return to zero controller output current, voltage, or power to indicate that the retriever 2 has been or is stopped. A power-down/off indication from the controller 12 and/or on/off button or key switch may also be provided. Also, an indicator may be provided to show that the throttle is going to zero, thereby indicating that the retriever 2 is or will stop.

In one embodiment, the controller 12 limits the power output of the electric motor 8 by limiting the current provided to the electric motor 8. In one embodiment, the controller 12 limits the power output of the electric motor 8 by limiting the voltage provided to the electric motor 8.

As is well known in the art, electric power of an electric motor 8 is the product of electric current multiplied by voltage, and mechanical output power from a drive system 10 is directly related to the product of electric power input to the motor 8 and the ratio of the gears. In this way the controller 12 can directly control the mechanical output power of the drive system 10 by limiting either the current or voltage provided to the electric motor 8.

The controller 12 may be constructed in analog or digital form so as to provide an ability to limit the electric current or voltage and to provide an ability to set the burst limit 22 and the selected limit 24. Exemplary controllers 12 that can be used to limit current to achieve these desired result are (but not limited to) models CS 1108, CS1125, and CS1126 made by Control Solutions, Inc. of 508 W. 5th Ave., Naperville, Ill. 60563, or model PMA 90-1220 made by PML Flightlink, Ltd. of Alton, Hampshire GU34ZQW England. Variations of these features can be found in other manufacturers' controllers 12.

In one embodiment, the electrical motor 8 is a brush DC series wound or separately excited motor. In one embodiment, the motor 8 is a brushless DC motor. In one embodiment, the motor 8 is an AC motor. In each case, a controller 12 is provided that is compatible with the motor 8 utilized.

As previously mentioned, using the controller 12 to limit the power output of the electrical motor 8 effectively limits the power to pull or push shopping carts by reducing the maximum torque applied to the drive system 10. This limits the total number of shopping carts that the retriever 2 is able to pull or push during retrieval. The power to push or pull multiple carts is directly related to the product of the number of carts (and their respective weight) and the power to pull or push an individual cart. Because the power output of the retriever 2 is limited and the power to push multiple carts varies directly with the number of carts, the retriever will be able to move a number of carts (or a total weight of carts) up to a maximum, but it may not be able to move greater than the maximum number of carts.

The electrical motor 8 can provide power to the drive system 10 at a level that promotes longer component life if the motor power is regularly controlled to be below levels that would cause failures. Alternately, if the electrical motor 8 regularly provides power to the drive system 10 at levels close to failure, the life of the drive system 10 or other vehicle components may be reduced. Further, if the electric motor 8 is regularly allowed to provide power to the drive system 10 at levels that exceed failure levels, then drive system or vehicle components may soon fail. This level of drive power may be termed as an overload of the vehicle. Component tests may be conducted and/or component specifications may be reviewed to determine the power level that is appropriate to optimize retriever 2 and cart component life. Once the appropriate power level is determined, the level may be used to set the selected limit 24. A similar method may be used to determine the appropriate level for the burst limit 22.

By using the controller 12 to limit the power output of the electrical motor 8, the owner of the retriever 2 is able to supervise/control the total number of carts retrieved with the retriever 2 by a user. In other words, the owner is able to limit the number of carts that a user may push/pull with the retriever 2, thereby decreasing the likelihood that the retriever 2, carts or other property will be damaged by attempting to move excessively long strings of shopping carts. Because the selected limit 24 and the burst limit 22 may be programmed into the controller 12, the supervision is available to the owner even when the owner is not present when the retriever 2 is being used by a user.

Unlike the present invention, when a user moves shopping carts with a prior art retriever, the user can run the retriever at a power level equal to the internal power limit 20 by simply placing the throttle control 14 at 100 percent full throttle. Although many prior art retrievers are capable of being run at 100 percent of the internal power limit 20, it is often unwise to do so because such power levels often overload one or more parts of the retriever and/or carts, thereby causing premature part failure.

When a controller 12 has a selected power limit 24 that is less than the internal power limit 20 (as is the case with the present invention), and a user places the speed throttle control 14 at 100 percent full throttle, the controller 12 may only provide power up to the selected power limit 24, not up to the internal power limit 20. Thus, the selected power limit 24 acts as a governor to prevent the retriever 2 from being subjected to overload conditions.

In one embodiment of the present invention, where the controller 12 also includes a burst mode, when a user places the speed throttle control 14 at 100 percent full throttle to start a retriever 2 and a string of carts from a dead stop, the power from the controller 12 to the electric motor 8 does not reach the level of the internal power limit 20 as in prior art retrievers. Instead, the controller 12 allows the power from the controller 12 to the electric motor 8 to ramp up to the burst power limit 22 and back down to the selected limit 24 over the time period $T_B$ it takes to reach a terminal velocity. This feature allows increased power for acceleration, but still keeps the power from the controller 12 to the motor 8 from approaching levels where overload conditions may occur (e.g., the internal level 20 or levels approaching the internal level 20).

In one embodiment, the time period $T_B$ is not only the time required to reach terminal velocity, it is also a programmable time duration for the burst current (i.e., burst limit 22). For example, if the retriever 2 is truly overloaded, the burst of current may initially move the shopping carts but the time period $T_B$ for which the burst current is available will be insufficient to get the carts to terminal velocity. Consequently, the retriever 2 will ultimately be unable to continue to move the carts and the carts will stop because the time period $T_B$ timed out and the current level shifted from the burst limit 22 to the level of the selected limit 24. This is advantageous because it again limits the number of carts that can be moved even though there is a burst of current initially available to get the cart column going.

Although the present invention has been described with reference to preferred embodiments, persons skilled in the art will recognize that changes may be made in form and detail without departing from the spirit and scope of the invention.

The invention claimed is:

1. A shopping cart retriever comprising:
   an electric motor;
   a drive system powered by the electric motor;
   a controller adapted to provide power to the electric motor and including a first power limit, a second power limit, and a burst mode; and
   a throttle control in communication with the controller,
   wherein the first power limit is the controller's normal power limit that results when the controller self-limits its maximum power output through a sensing feature of the controller that exists to prevent damage to the controller,
   wherein the second power limit is selectable and limits the controller's maximum power output to a level that is less than that of the first power limit, and
   wherein the burst mode allows the control's maximum power output to exceed the second power limit for a limited time before again becoming subject to the second power limit.

2. The retriever of claim 1, wherein the second power limit is selected to provide a power output level that optimizes the operational life of a component of the retriever or of a shopping cart.

3. The retriever of claim 1, wherein the second power limit is selected to provide a power output level that prevents the retriever from being subjected to an overload condition.

4. The retriever of claim 1, wherein the burst mode includes a third power limit that is selectable and limits the control's maximum power output to a level that is less than that of the first power limit and greater than that of the second power limit.

5. The retriever of claim 1, wherein the second power limit attenuates current.

6. The retriever of claim 1, wherein the second power limit attenuates voltage.

7. The retriever of claim 1, wherein the sensing feature is a temperature sensing feature that senses a temperature of the controller.

8. The retriever of claim 1, wherein the sensing feature is a current level sensing feature that senses a current level passing through the controller.

9. The retriever of claim 1, wherein the electric motor is a brush DC motor.

10. The retriever of claim 9, wherein the brush DC motor is a series wound DC motor.

11. The retriever of claim 9, wherein the brush DC motor is a separately excited DC motor.

12. The retriever of claim 1, wherein the electric motor is a brushless DC motor.

13. The retriever of claim 1, wherein the electric motor is an AC motor.

14. A method of operating a shopping cart retriever, the method comprising:
   placing a controller in electrical communication with an electric motor adapted to power a drive system of the retriever;
   placing a throttle control in communication with the controller;
   setting the controller at a first power limit that is less than a second power limit, wherein the second power limit is the controller's normal power limit that results when the controller self-limits its maximum power output through a sensing feature of the controller that exists to prevent damage to the controller;
   attaching the retriever to at least one shopping cart; and
   activating a burst mode to accelerate the retriever and the at least one shopping cart from a complete stop to a terminal velocity, wherein power provided to the motor from the controller rapidly increases to a burst limit and then rapidly decreases from the burst limit to reach a level approximate the first limit when the retriever approaches the terminal velocity, wherein the burst limit is less than the second power limit and greater than the first power limit.

15. The method of claim 14, wherein the first power limit is set to provide a power output level that optimizes the operational life of a component of the retriever or of a shopping cart.

16. The method of claim 14, wherein the first power limit is set to provide a power output level that prevents the retriever from being subjected to an overload condition.

17. The method of claim 14, wherein the first power limit is achieved by attenuating a current or a voltage provided to the electrical motor by the controller.

18. A shopping cart retriever comprising:
   an electric motor;
   a drive system powered by the electric motor; and
   a controlling means for controlling power to the electric motor including
      a first power-limiting means for limiting power to the electric motor;
      a second power-limiting means for limiting power to the electric motor;
      a burst means for overriding the second power-limiting means.

19. The retriever of claim 18, wherein the second power-limiting means limits a power output level to optimize the operational life of a component of the retriever or of a shopping cart.

20. The retriever of claim 18, wherein the second power-limiting means limits a power output level to prevent the retriever from being subjected to an overload condition.

21. The retriever of claim 18, wherein the controlling means includes a third power-limiting means for limiting the power to the electric motor, wherein the third power-limiting means limits a maximum power output of the controlling means to a level that is less than that allowed by the first power-limiting means and greater than that allowed by the second power-limiting means.

* * * * *

UNITED STATES PATENT AND TRADEMARK OFFICE
CERTIFICATE OF CORRECTION

PATENT NO. : 7,493,979 B2  Page 1 of 1
APPLICATION NO. : 12/125138
DATED : February 24, 2009
INVENTOR(S) : Daniel T. Johnson It is certified that error appears in the above-identified patent and that said Letters Patent is hereby corrected as shown below:

CLAIMS

| Column | Line | PTO | Should Read |
|---|---|---|---|
| 8 | 34 | "control's maximum" | -- controller's maximum -- |
| 8 | 46-47 | "control's maximum" | -- controller's maximum -- |

Signed and Sealed this

Second Day of June, 2009

JOHN DOLL
*Acting Director of the United States Patent and Trademark Office*